(12) United States Patent
DiPippo et al.

(10) Patent No.: US 6,389,229 B1
(45) Date of Patent: May 14, 2002

(54) OPTICAL FSTOP/RESOLUTION APPARATUS AND METHOD FOR SPECIFIED DEPTH-OF-FIELD

(75) Inventors: Mark J. DiPippo, Newport; Bruce J. Bates, Portsmouth, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/575,542

(22) Filed: May 17, 2000

(51) Int. Cl.[7] .............................................. G03B 7/00

(52) U.S. Cl. ............................................ 396/63; 396/65

(58) Field of Search ...................... 396/63, 121, 65–70, 396/257, 258, 260

(56) References Cited

U.S. PATENT DOCUMENTS 4,829,331 A * 5/1989 Aihara ........................ 396/121

* cited by examiner

*Primary Examiner*—W. B. Perkey
(74) *Attorney, Agent, or Firm*—Michael J. McGowan; Michael F. Oglo; Prithvi C. Lall

(57) ABSTRACT

A method and apparatus to determine the $f_{stop}$ that provides optimal image resolution for a predetermined depth-of-field. An approximate and exact method and apparatus are provided to determine the optimal resolution $f_{stop}$. The optimal resolution $f_{stop}$ is a function of the lens focal length, depth-of-field in front of the object, wavelength of light, and distance of the object to the lens center. Once the optimal resolution $f_{stop}$ is determined, the camera is adjusted to the closest discrete $f_{stop}$ available. When the approximate field technique is utilized, the camera must be adjusted to the discrete $f_{stop}$ closest to, but not exceeding, the computed $f_{stop}$.

17 Claims, 8 Drawing Sheets

OPTICAL FSTOP/RESOLUTION APPARATUS AND METHOD FOR SPECIFIED DEPTH-OF-FIELD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to determining a camera's optimal $f_{stop}$, and more particularly to a method and apparatus for computing the $f_{stop}$ that provides optimal resolution for a specified depth-of-field.

(2) Description of the Prior Art

It is well known that a camera's $f_{stop}$ controls the depth-of-field in a photographic image. The depth-of-field is the region in which objects remain focused, and objects outside the depth-of-field are not focused. For a given depth-of-field, another measure of image quality is the resolution, or image sharpness, within that depth-of-field. The depth-of-field resolution is determined by film properties (grain size), lens properties (focal length and aperture), light properties (wavelength), and depth-of-field size.

Because depth-of-field and resolution are each affected by a camera's $f_{stop}$, photographers often compromise depth-of-field for increased resolution, or vice-versa. U.S. Pat. No. 4,785,323 details a method of selecting an aperture/shutter combination with an optimum depth-of-field to blur ratio, but maximum resolution throughout the depth-of-field is not considered. Alternately, U.S. Pat. No. 4,792,823 describes a manual depth-of-field preview device in which an optimum depth-of-field is user-determined by previewing images. Again, optimum settings are not computed or considered. U.S. Pat. Nos. 5,049,916 and 5,130,739 optimize photographic exposure through extra system speed, but sacrifice depth-of-field for shutter speed to minimize blur from system and object motion. These patents do not address picture sharpness or depth-of-field control. U.S. Pat. No. 5,532,782 provides calculations for an $f_{stop}$ that ensure focus for multiple objects at various distances; however, maximum sharpness or resolution is not addressed.

There is currently no method or apparatus for computing the maximum resolution or image sharpness within a pre-defined depth-of-field. What is needed is a method and apparatus that allow a photographer to compute $f_{stop}$ for optimal resolution throughout a predetermined depth-of-field.

SUMMARY OF THE INVENTION

It is a general purpose and object of the present invention to provide a method and apparatus to compute $f_{stop}$ to provide maximum image resolution or sharpness.

It is a further object to provide such computation for a predetermined depth-of-field specified by the photographer.

It is yet another object to provide such computation in an exact manner, and in an approximate manner for relative computational ease.

Other objects and advantages of the present invention will become more obvious hereinafter in the specification and drawings.

These objects are accomplished with the present invention by a method and apparatus to determine $f_{stop}$ that provides optimal image resolution for a predetermined depth-of-field. An approximate and exact method and apparatus are provided to determine the optimal resolution $f_{stop}$. The optimal resolution $f_{stop}$ is a function of the lens focal length, depth-of-field in front of the object, wavelength of light, and distance of the object to the lens center. Once the optimal resolution $f_{stop}$ is determined, the camera is adjusted to the closest discrete $f_{stop}$ available. When the approximate field technique is utilized, the camera must be adjusted to the discrete $f_{stop}$ closest to, but not exceeding, the computed $f_{stop}$.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
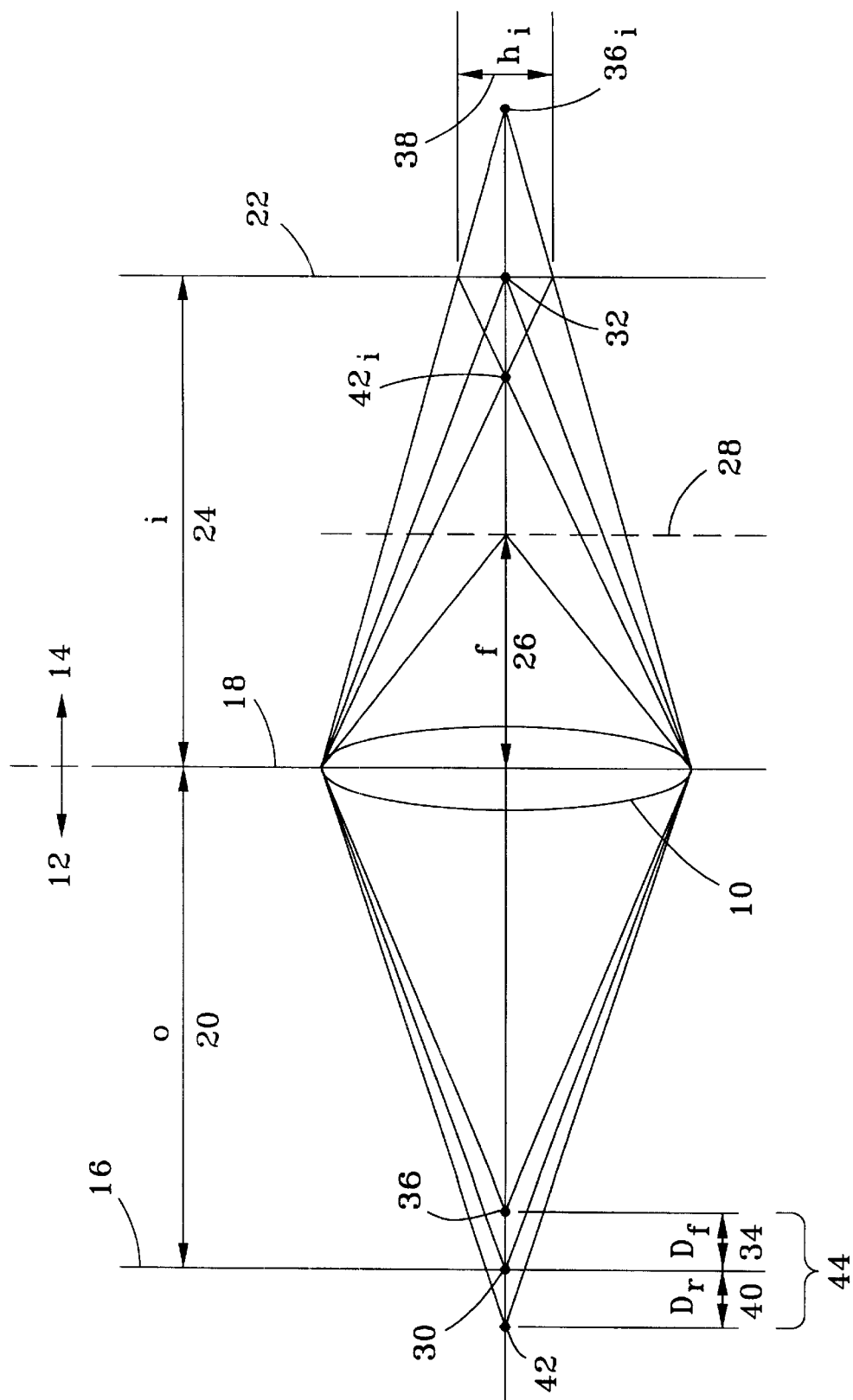
FIG. 1 is a basic camera lens diagram to explain the notation.

Referring now to FIG. 1, there is shown a diagram indicating a camera lens 10 and associated optical references to define the terms to be used herein. Object space 12 shall be defined as all points on the side of the lens opposite the film, while image space 14 defines all points on the side of the lens containing the film. Similarly, the object plane 16 is the plane in object space 12 containing the object of interest, parallel to the plane containing the lens 18, and a distance o 20 from the lens. The image plane 22 is the plane in image space 14 parallel to the plane containing the lens 18, and a distance i 24 from the lens.

Points in object space 12 are mapped into image space 14 by the thin lens formula:

$$1/f = 1/o + 1/i, \qquad (1)$$

where f 26 is the lens 10 focal length equal to the distance between the plane containing the lens center 18, and a parallel image plane 28 containing the focused image of an object at infinity in object space 12.

As FIG. 1 shows, a point 30 on the object plane translates to a point 32 on the image plane. As objects move away from the object plane 16, the focus of the image of those objects deteriorates; however, objects close to the object plane 16 may still provide focused images, and this is known as the depth-of-field effect. Objects within the depth-of-field, but not on the object plane 16, project to a spot or disk on the image plane 22. If $D_f$ 34 is the depth-of-field in front of the object, then a point 36 at a distance $D_f$ 34 in front of the object plane 16 projects to a point 36$i$ in image space such that the image plane 22 contains a spot or disk of diameter $h_i$ 38. Similarly, if $D_r$ 40 is the depth-of-field to the rear of the object, then a point 42 at a distance $D_r$ 40 to the rear of the object plane 16 also projects to a point 42$i$ in the image space such that the image plane 22 contains a spot or disk of diameter $h_i$ 38. For objects within the total depth-of-field, $D_f+D_r$ 44, the resolution limit at the image plane 22 is therefore $h_i$ 38, otherwise known as the spot size, or resolution.

A point in object space 12 is therefore in focus if its image on the image plane 22 is less than $h_i$ 38 in diameter, and a point in object space 12 is in perfect focus if its image on the image plane 22 is also a point. It then follows that two points in object space are resolvable if their image plane images are disjoint.

Image resolution is affected by several factors including film grain size, diffraction, and depth-of-field. Film grain size does not depend upon camera settings and is independent of $f_{stop}$ that controls the camera aperture. Additionally, film grain size remains constant regardless of depth-of-field, object distance, or lens focal length.

Figure 2:
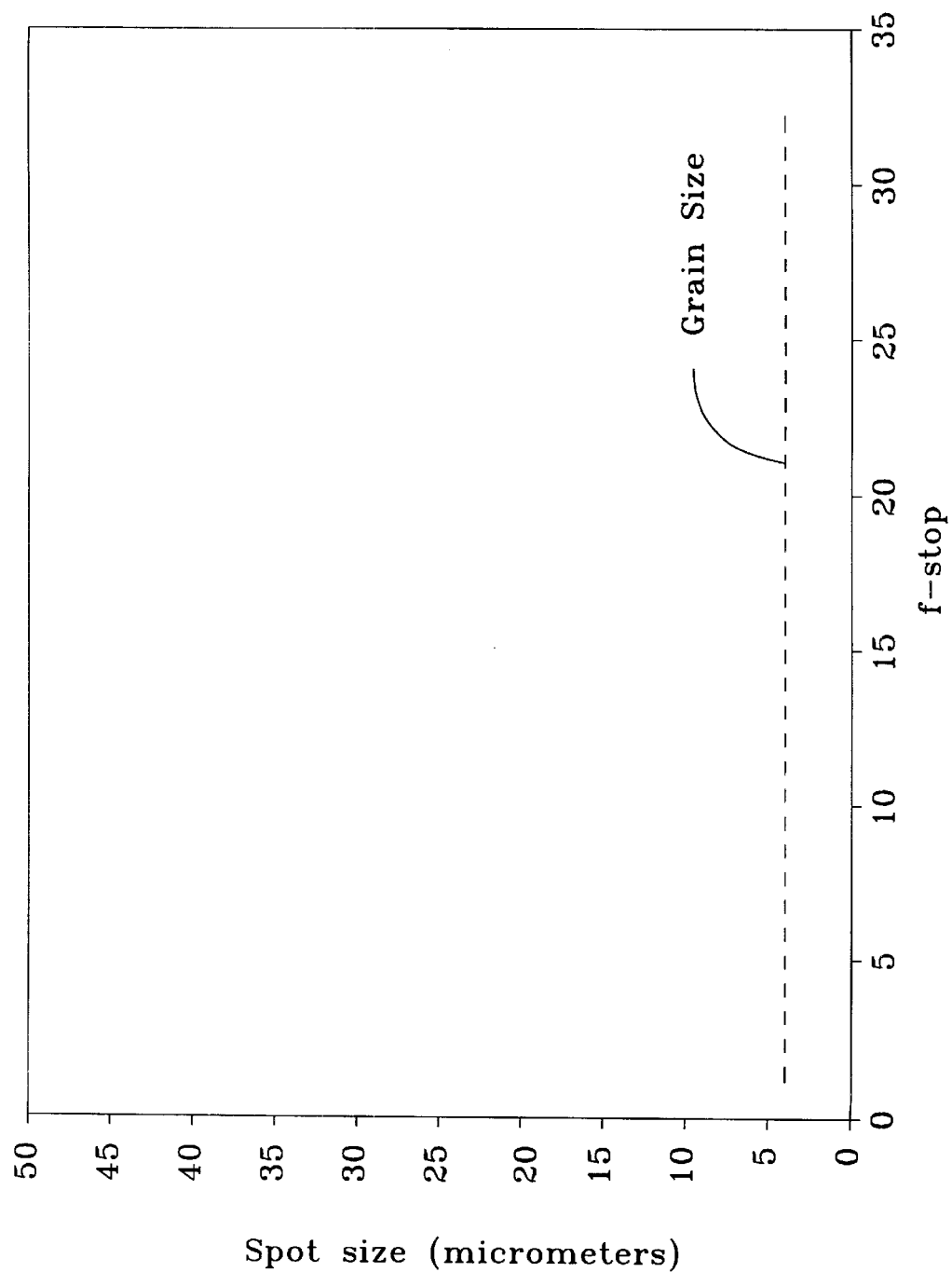
FIG. 2 is a plot of spot size/resolution versus $f_{stop}$ for grain size.

Referring now to FIG. 2, there is shown a plot of spot size in the image plane versus $f_{stop}$ as a function of grain size. As FIG. 2 indicates, the relationship between spot size or resolution, and $f_{stop}$, is constant for all $f_{stop}$ values.

Figure 3:
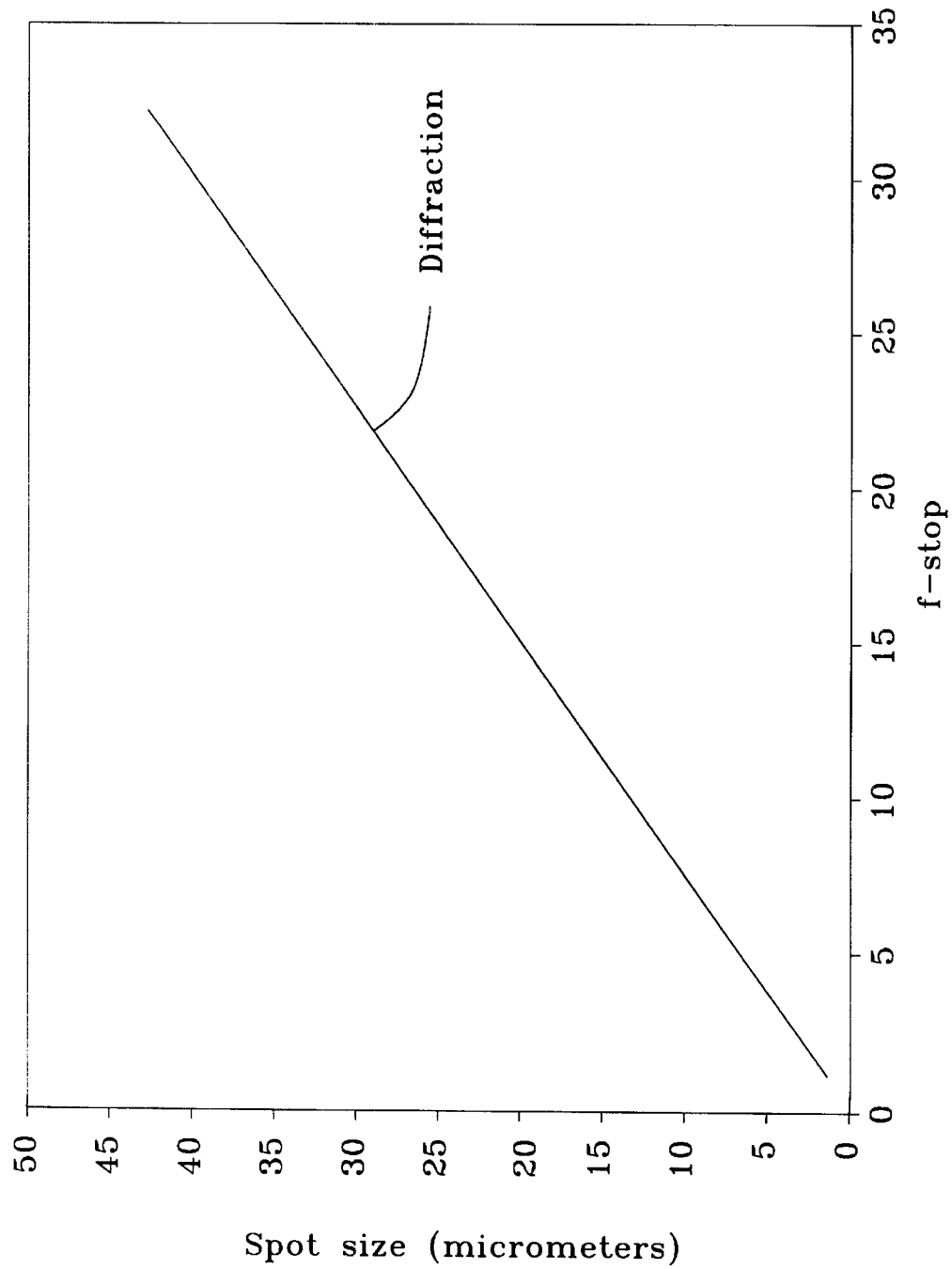
FIG. 3 is a plot of spot size/resolution versus $f_{stop}$ for diffraction using a fixed wavelength of light.

A camera aperture restricts light waves to cause interference known as diffraction, and diffraction limits image resolution. The resolution effects from diffraction depend on the light wavelength, aperture diameter (i.e., $f_{stop}$), and distance between the film and the lens. E. Hecht, Optics, $2^{nd}$ Edition, provides a well known relationship between diffraction spot size and the circular aperture opening:

$$\text{Diffraction spot diameter} = 2.44 * i * \lambda / A \quad (2)$$

$$= \lambda * \{(o*f)/(o-f)\} * (f_{stop}/f) \quad (3)$$

where:

$\lambda$ is the wavelength of light (angstroms);

A is the aperture diameter (meters); and $f_{stop}=f/A$. Referring now to FIG. 3, there is shown the basic linear relationship between spot size and $f_{stop}$ for a constant light wavelength, $\lambda$, where o and f are held constant. As FIG. 3 indicates, for a constant wavelength, resolution from diffraction decreases (spot size increases) as $f_{stop}$ increases.

Figure 4:
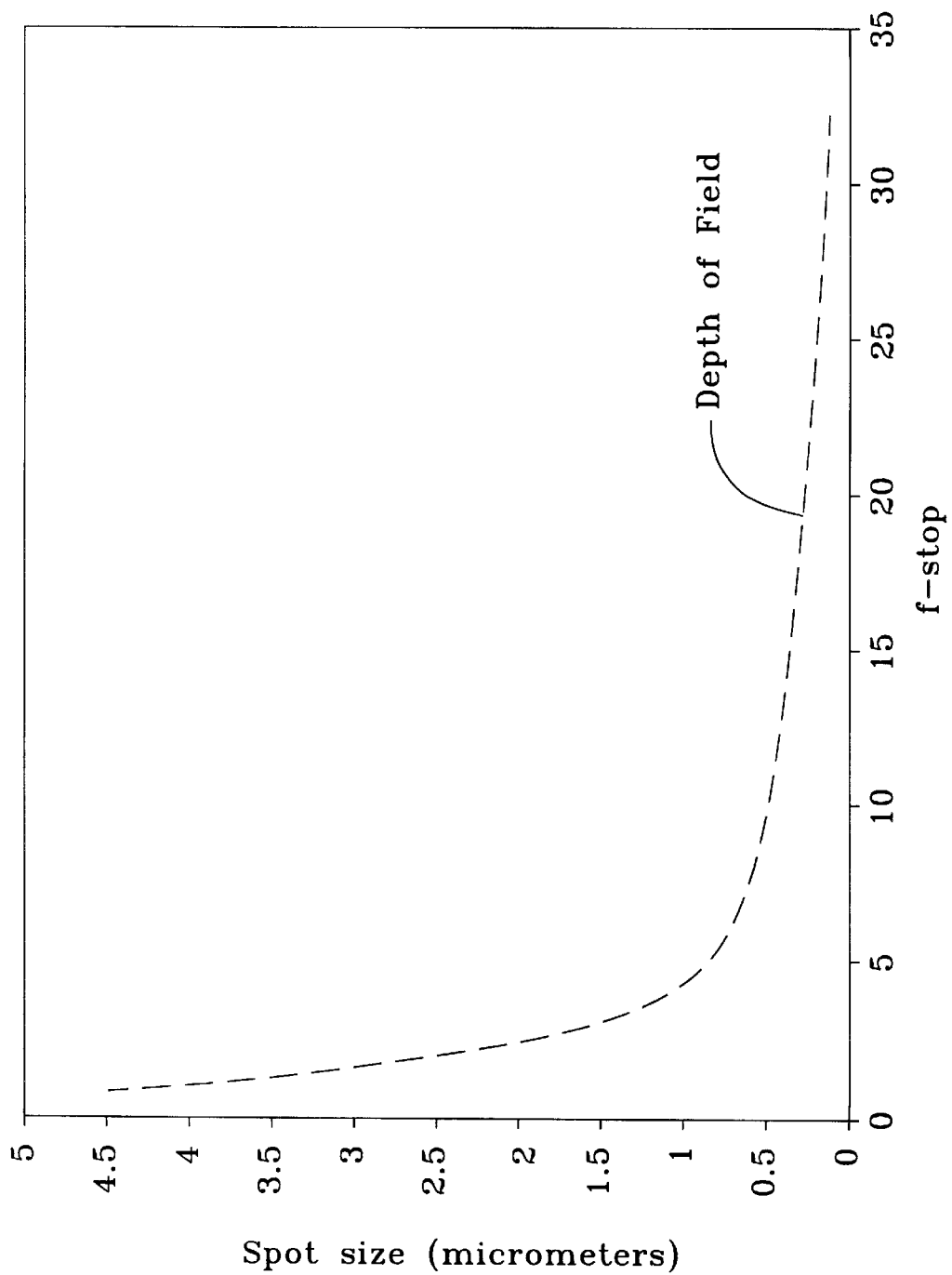
FIG. 4 is a plot of spot size/resolution versus $f_{stop}$ for a fixed depth-of-field.

Image resolution is also limited by the fact that all objects cannot be located in the object plane. As stated previously, objects within the depth-of-field and located on the lens axis, project onto the image plane as a disk with diameter $h_i$ given by the well known equation:

$$h_i = (f/f_{stop}) * (f/(o-f)) * (d/(o-d)) \quad (4)$$

where:

d is depth-of-field (in front of object) (meters). The resolution due to depth-of-field therefore depends upon $f_{stop}$, focal length, object distance, and distance from the object plane (depth-of-field). Referring now to FIG. 4, there is shown a plot of spot size or resolution versus $f_{stop}$ for a constant depth-of-field, with f and o held constant, indicating a hyperbolic shape. As $f_{stop}$ increases, depth-of-field changes cause resolution to increase (spot size decreases).

Figure 5:
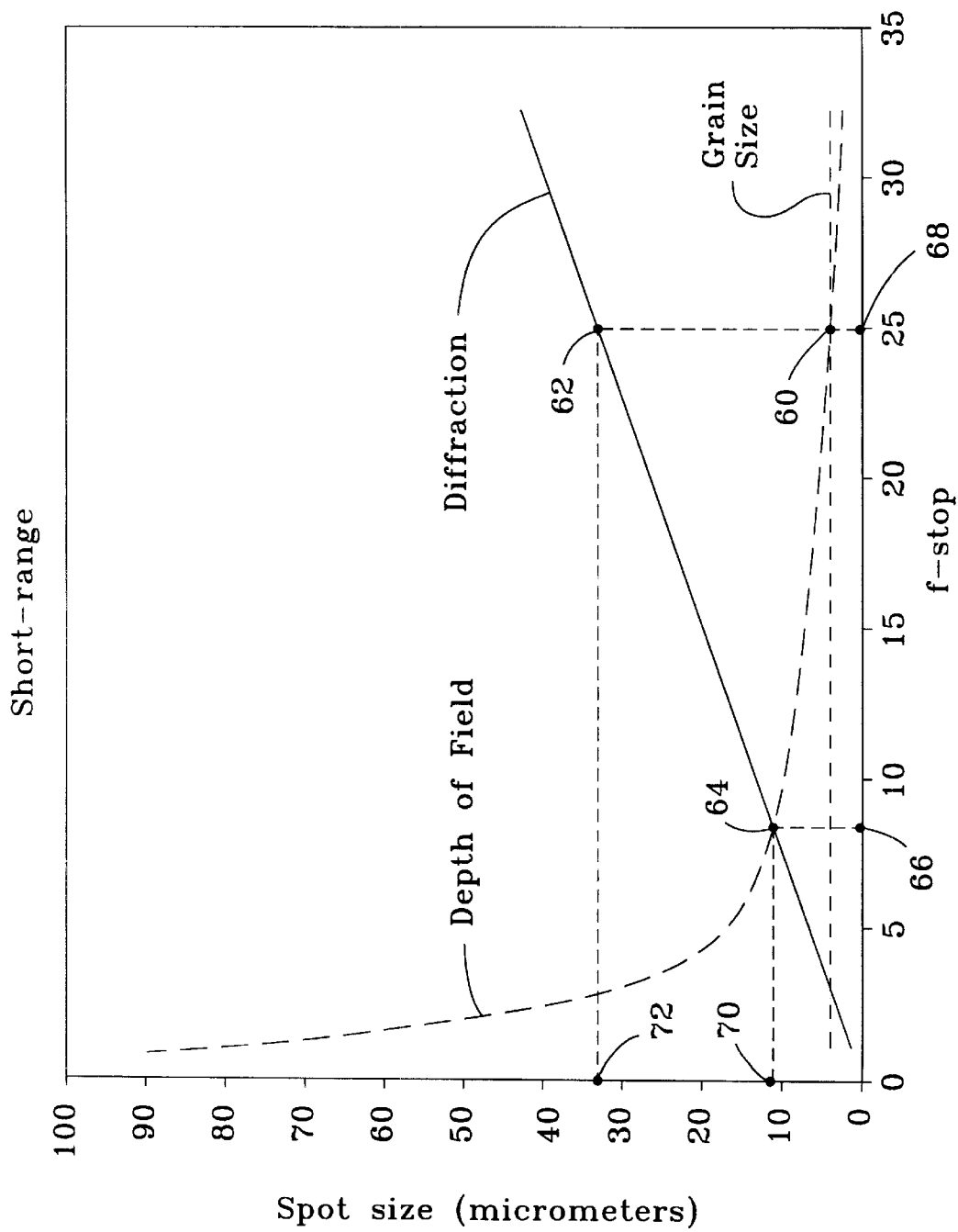
FIG. 5 is a plot of spot size/resolution versus $f_{stop}$ for a specified short-range photography scenario.

Referring now to FIG. 5, there is shown a plot of film grain size, diffraction, and depth-of-field on the same plot of resolution versus $f_{stop}$. Because the three effects are always present, plotting on the same graph allows insight into the dominating effect. To produce the graphs in FIG. 5, light wavelength was set to 5500 angstroms as a compromise between the 4000 angstrom and 7000 angstrom values in the visible spectrum. For FIG. 5, close distance, or short-range photography was considered, and accordingly, object distance was set at 1 meter, focal length to 28 millimeters, depth-of-field to 0.1 meter, and film grain size to 4 micrometers.

Conventional $f_{stop}$ computations suggest the $f_{stop}$ corresponding to the intersection of the depth-of-field and grain size curves 60. As FIG. 5 indicates, the $f_{stop}$ at the intersection of the depth-of-field and grain size curves 60 corresponds to an $f_{stop}$ where diffraction 62, not depth-of-field or grain size, limits the resolution or spot size. Selecting the $f_{stop}$ at the intersection of the depth-of-field and grain size curves 60 therefore ignores the dominating and limiting diffraction effect 62 on resolution at that $f_{stop}$.

The invention presented herein is to use the $f_{stop}$ providing maximum resolution, or equivalently, the $f_{stop}$ that minimizes the maximum of the three spot sizes. FIG. 5 shows that depth-of-field limits the resolution for $f_{stop}$ values less than 8.5 64, 66, while diffraction limits the resolution for $f_{stop}$ values greater than 8.5 64, 66. Because depth-of-field resolution decreases as $f_{stop}$ increases, while diffraction resolution increases as $f_{stop}$ increases, the minimum spot size, or optimum resolution, occurs at the intersection 64 of the depth-of-field and diffraction curves. When this intersection 64 is above the film grain line as in this short-range scenario, film grain does not limit resolution more than diffraction or depth-of-field. The $f_{stop}$ providing optimal resolution in the short-range scenario is therefore that $f_{stop}$ corresponding to the intersection of the depth-of-field and diffraction curves 64. As FIG. 5 shows, the invention's $f_{stop}$ 66 is nearly one-third the conventional method $f_{stop}$ 68, with the invention producing a smaller spot size 70 (i.e., increased resolution) of nearly one-third the conventional method $f_{stop}$ spot size 72.

Figure 6:
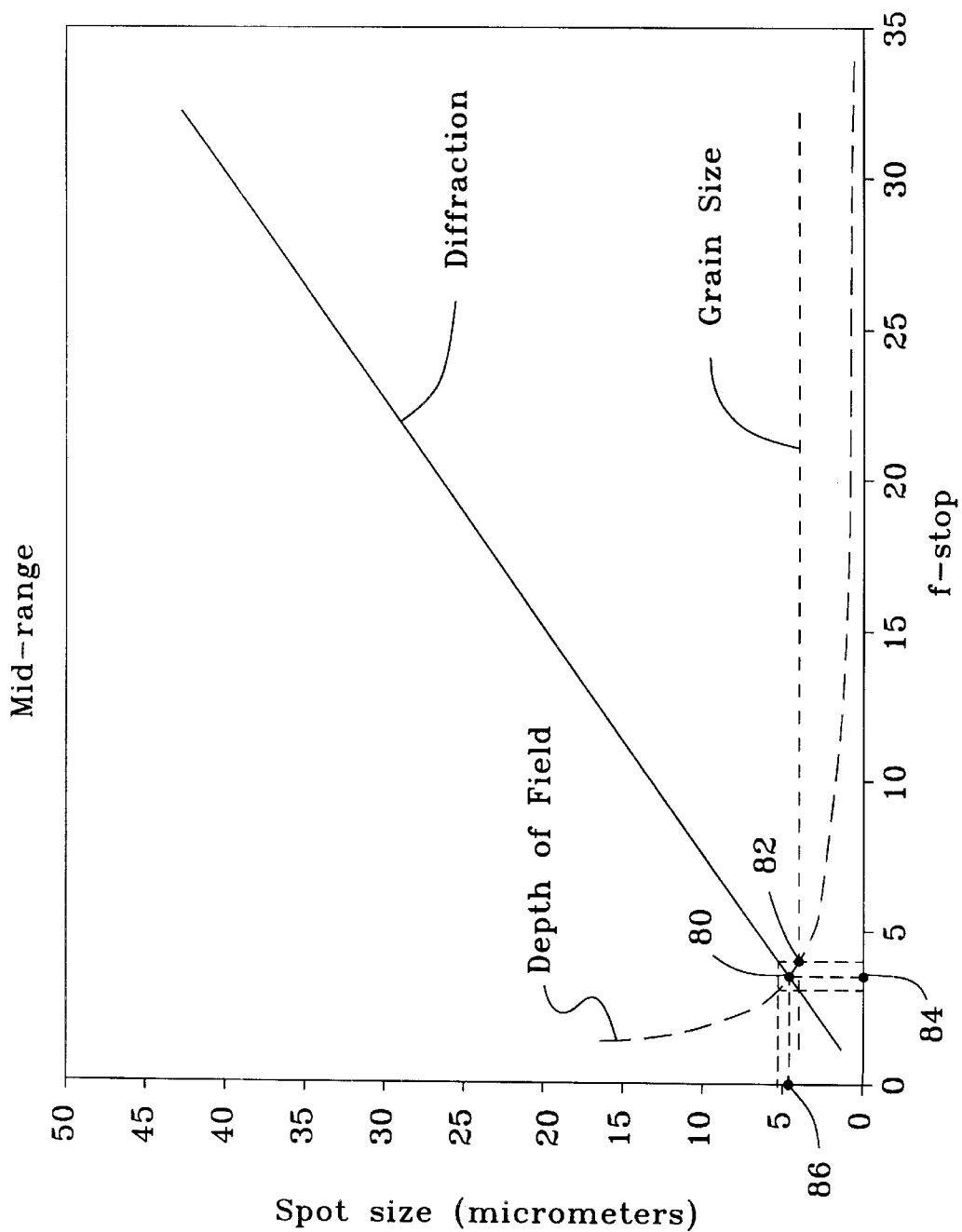
FIG. 6 is a plot of spot size/resolution versus $f_{stop}$ for a specified mid-range photography scenario.

Referring now to FIG. 6, there is shown a plot of the three resolution factors for mid-range photography. The FIG. 6 curves used an object distance set to 100 meters, focal length to 50 millimeters, depth-of-field to 40 meters, film grain size to 4 micrometers, and light wavelength to 5500 angstroms. As FIG. 6 indicates, just as in FIG. 5, for all $f_{stop}$ values, either diffraction or depth-of-field limits the resolution, with the intersection of the depth-of-field and diffraction curves occurring above the film grain size curve. Since film grain size is not the limiting resolution factor in the mid-range scenario, the $f_{stop}$ providing maximum resolution remains the intersection of the diffraction and depth-of-field curves 80. Once again, the $f_{stop}$ generated by the conventional technique, at the intersection of the depth-of-field and grain size curves 82, exists in a region where diffraction limits the resolution. Using the invention to determine $f_{stop}$ as the intersection of the depth-of-field and diffraction curves 80, the optimal $f_{stop}$ 84 providing maximum resolution is obtained. An $f_{stop}$ less than the optimal $f_{stop}$ 84 is limited by depth-of-field to produce larger spot sizes than the optimal spot size 86; and an $f_{stop}$ greater than the optimal $f_{stop}$ 84 is limited by diffraction to produce larger spot sizes than the optimal spot size 86.

Figure 7:
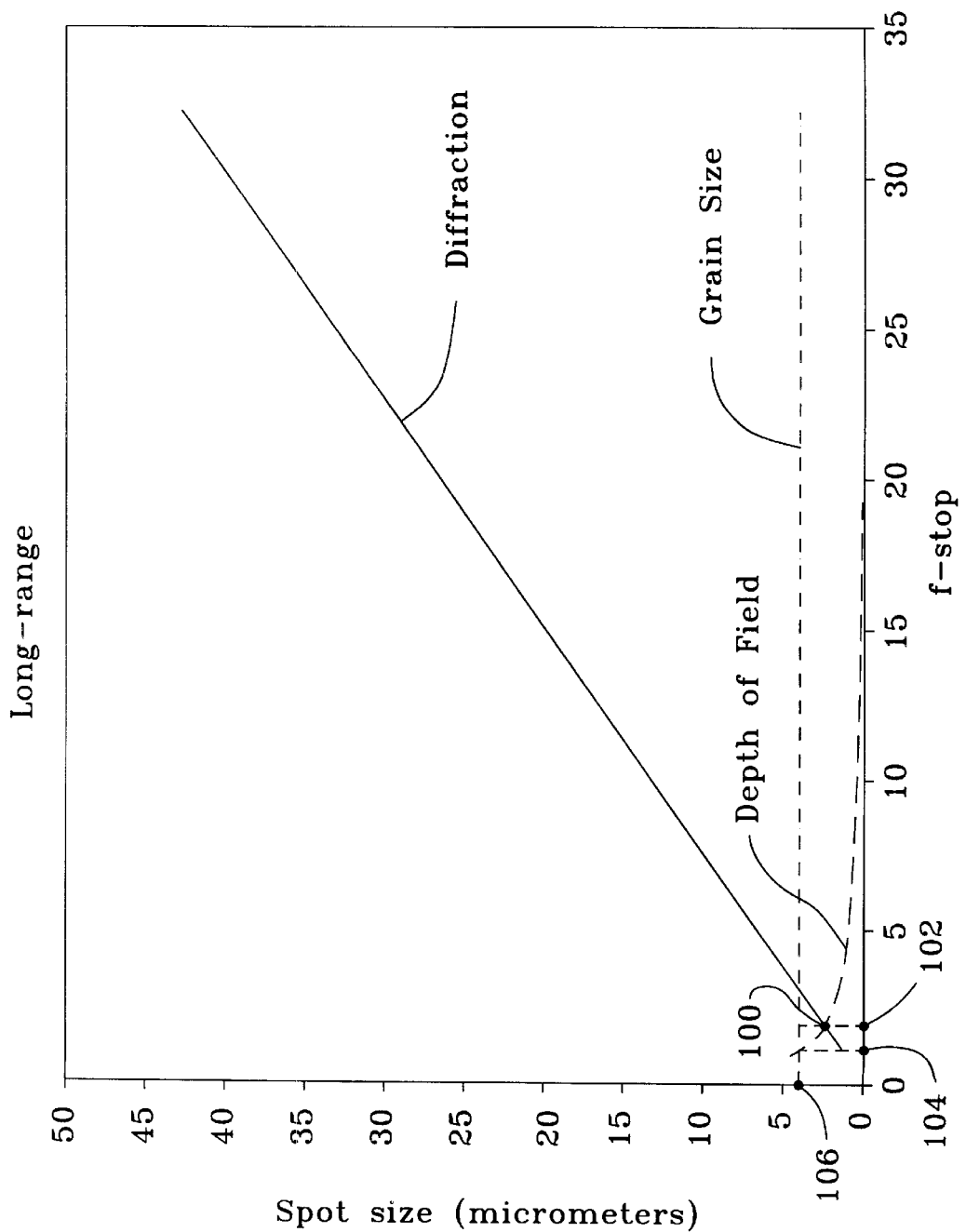
FIG. 7 is a plot of spot size/resolution versus $f_{stop}$ for a specified long-range photography scenario.

Referring now to FIG. 7, there is shown a plot of the three resolution factors for long-range photography. FIG. 7 curves used an object distance of 1000 meters, focal length set to 200 millimeters, depth-of-field set to 100 meters, film grain size of 4 micrometers, and light wavelength set to 5500 angstroms. As FIG. 7 indicates, the depth-of-field and diffraction curves intersect 100 below the film grain size. The invention indicates through FIG. 7 that when the depth-of-field and diffraction curves intersect 100 below the film grain size, any $f_{stop}$ value in the region where the depth-of-field and diffraction curves are below the film grain curve, provides the maximum resolution as limited by the film grain size. As the diffraction curve crosses the film grain curve, the diffraction effect limits the resolution. The $f_{stop}$ computed by the invention 102 therefore provides equal resolution to the $f_{stop}$ provided by the conventional computation 104 in this long-range photography case; however, the invention provides insight into a range of $f_{stop}$ values that achieve this optimal resolution. For this long-range photography scenario, all $f_{stop}$ in the region where the diffraction spot size is less than the film grain spot size provide a resolution equal to the film grain spot size 106; otherwise, diffraction limits the resolution. The $f_{stop}$ providing maximum resolution is therefore an $f_{stop}$ in the range in which the film grain size remains the dominating effect.

FIGS. 5, 6, and 7 illustrate the invention that stipulates for a predetermined depth-of-field, the optimal $f_{stop}$ is the intersection of the diffraction and depth-of-field curves. If this intersection is greater than the film grain spot size, the intersection provides the optimal resolution; alternately, if the intersection is less than the film grain spot size, the invention provides a range of suitable $f_{stop}$ values that provide maximum resolution, however that resolution is provided by the film grain spot size.

The intersection of the depth-of-field and diffraction curves requires solving equations (3) and (4) simultaneously for $f_{stop}$, assuming f<<o and d<<o, setting λ=4000 angstroms, and specifying f in millimeters, thereby resulting in the following computation for the optimal $f_{stop}$:

$$\text{optimal } f_{stop} = f * \text{sqrt}(d)/o \tag{5}$$

where:
  f is in millimeters;
  o is in meters; and,
  d is in meters.

Since λ ranges between 4000 and 7000 angstroms, and equation (5) was derived using λ=4000 angstroms, equation (5) provides an upper bound on the optimal $f_{stop}$.

When the optimal expression for $f_{stop}$ from equation (5) is substituted into equation (4), and the same assumptions are made that f<<o, d<<o, λ=4000 angstroms, and specifying f in millimeters, the following expression for optimal resolution results:

$$\text{optimal resolution} = f * \text{sqrt}(d)/o \text{ microns} \tag{6}$$

where:
  f is in millimeters;
  o is in meters; and,
  d is in meters.

Equations (5) and (6) indicate that the optimal $f_{stop}$ and optimal resolution expressions are computationally identical. The photographer must merely compute the expression $f*\text{sqrt}(d)/o$ and interpret the result as being the optimal $f_{stop}$ or the optimal resolution in microns. If the resolution is smaller than the film grain resolution, the film grain limits the image resolution; otherwise, diffraction and depth-of-field effects limit the resolution and the invention provides the optimal resolution $f_{stop}$ for the given depth-of-field.

Because $f_{stop}$ settings are discrete rather than continuous, photographic equipment may not contain the exact $f_{stop}$ provided by equation (5). Since equation (5) assumes λ=4000 angstroms and d<<o, equation (5) provides an upper bound for the optimal $f_{stop}$; therefore, in setting photographic equipment for the optimal $f_{stop}$ computed by equation (5), the $f_{stop}$ closest to the computed $f_{stop}$, but not exceeding the computed $f_{stop}$, should be chosen.

Although equations (5) and (6) are accurate, reliable, and easily computed expressions for the optimal $f_{stop}$ and optimal resolution in microns, the expressions were derived using the approximations that f<<o, d<<o, λ=4000 angstroms, and f units of millimeters. Expressions (5) and (6) are therefore referred to as the "field technique" or approximate method, as the computations may be simply computed. For more exact computations, the optimal $f_{stop}$ follows, derived by solving equations (3) and (4) simultaneously for $f_{stop}$:

$$\text{exact optimal } f_{stop} = f*\text{sqrt}(d/(2.44*\lambda*o*(o-d))) \tag{7}$$

where:
  λ is in meters;
  f is in meters;
  o is in meters; and,
  d is in meters. For photographers desiring an exact computation of the optimal $f_{stop}$ or resolution in microns, the computation described by equation (7) may be used. Because equation (7) is more complex than equations (5) or (6), it is anticipated that a computer or calculator could be programmed or utilized in solving equation (7). The computer or calculator may be integrated with the camera, or a separate device. The same devices and configurations may be utilized for the field technique; however, the field technique's relative simplicity increases the likelihood that a the optimal $f_{stop}$ can be computed without any extraneous device.

Figure 8:
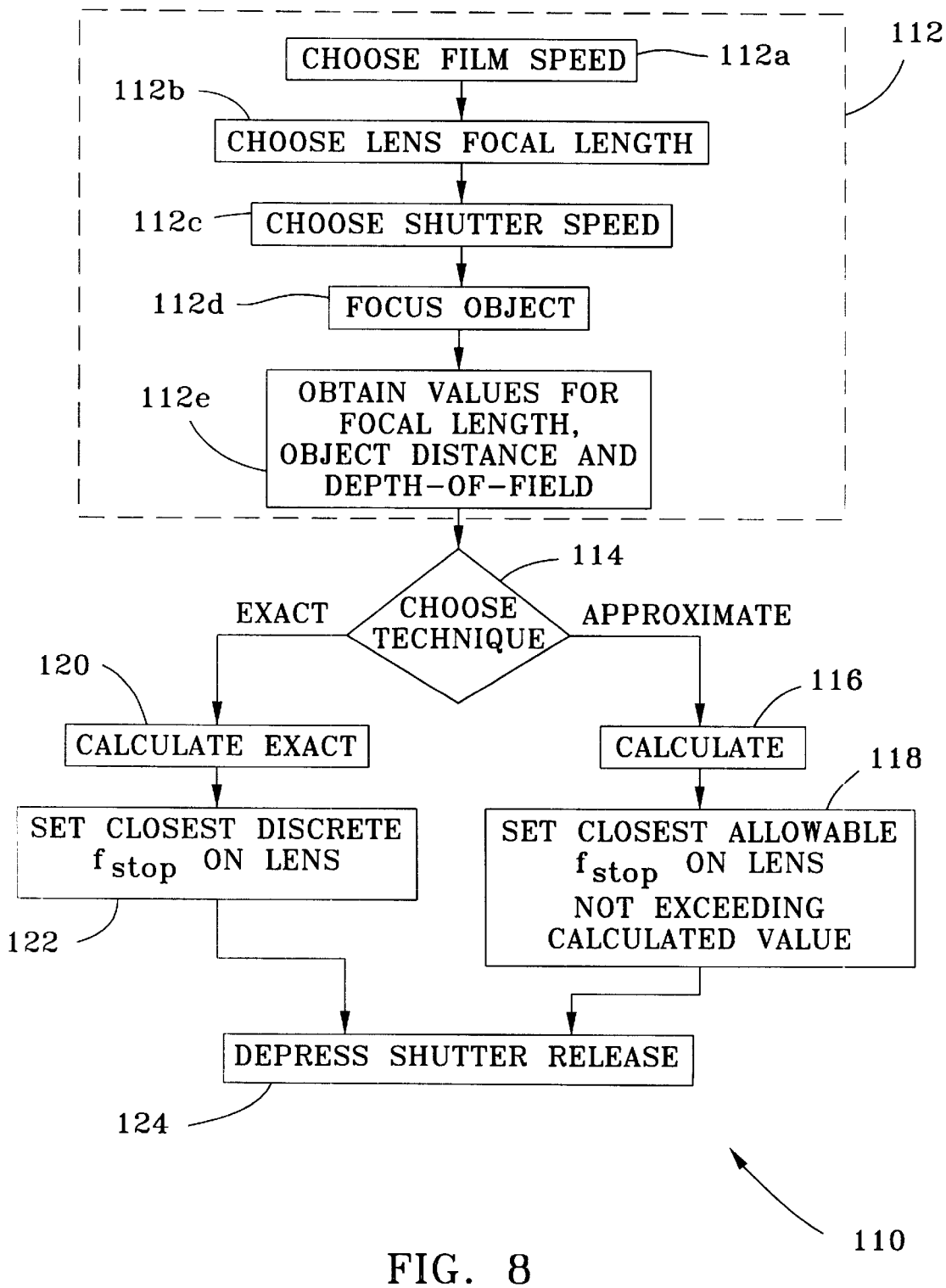
FIG. 8 is a diagram of the method and apparatus for determining the $f_{stop}$ for optimal resolution, depending upon the choice of field technique or exact method.

Referring now to FIG. 8, there is shown a procedure 110 for determining the optimum $f_{stop}$ and resolution. The general photographic procedure 112 is not altered until the $f_{stop}$ determination is required. The general photographic procedure includes choosing a film speed 112a, selecting a lens focal length 112b, choosing a shutter speed 112c, focusing the object 112d, and obtaining values for focal length, object distance, and depth-of-field 112e. The invention presented herein is then inserted into the general photographic procedure to provide the optimal $f_{stop}$ for the desired depth-of-field. The photographer must first determine whether the exact or approximate $f_{stop}$ will be computed 114. If the approximate or field technique is being implemented, the approximate $f_{stop}$ established by equation (5) is computed 116, and the camera is adjusted using the $f_{stop}$ closest to, but not exceeding, the $f_{stop}$ provided by equation (5) 118. This $f_{stop}$ value is equivalent to the resolution in microns. Alternately, if the exact method is desired, the exact $f_{stop}$ is computed using equation (7) 120, and the camera is adjusted to the closest discrete $f_{stop}$ 122. Once the camera is adjusted for the computed $f_{stop}$, at 118 or 122, the shutter release may be depressed 124.

The advantage of the present invention over the prior art is that the invention provides a method and apparatus to determine an $f_{stop}$ to provide optimal resolution for a specified depth-of-field. Within the method provided, an estimate and an exact procedure are identified depending upon the computational resources available.

What has thus been described is a method and apparatus to determine the $f_{stop}$ that provides optimal image resolution for a predetermined depth-of-field. An approximate and exact method and apparatus are provided to determine the optimal resolution $f_{stop}$. The optimal resolution $f_{stop}$ is a function of the lens focal length, depth-of-field in front of the object, wavelength of light, and distance of the object to the lens center. Once the optimal resolution $f_{stop}$ is determined, the camera is adjusted to the closest discrete $f_{stop}$ available. When the approximate field technique is utilized, the camera must be adjusted to the discrete $f_{stop}$ closest to, but not exceeding, the computed $f_{stop}$.

Although the present invention has been described relative to a specific embodiment thereof, it is not so limited. Obviously many modifications and variations of the present invention may become apparent in light of the above teachings. For example, the computations may be performed with or without the assistance of electronics; and such electronics may or may not be integrated to the camera for automatic adjustment. The desired depth-of-field in front of the object may be approximated or measured using a range finder, etc. Although the wavelength of light range specified the visible spectrum, other spectra (e.g., infrared) are also valid in the optimal $f_{stop}$ computations.

Many additional changes in the details, materials, steps and arrangement of parts, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A method for setting a camera $f_{stop}$, comprising:
    selecting a fixed focal length, f;
    determining a single distance, o, between said camera and an object to be focused;
    inputting a desired depth-of-field, d, in front of said object;
    computing an optimal $f_{stop}$ as a function of said depth-of-field, said distance and said focal length; and
    adjusting said camera $f_{stop}$ to a discrete $f_{stop}$ closest to said computed optimal $f_{stop}$.

2. The method of claim 1, wherein computing the optimal $f_{stop}$ further comprises:
    specifying a wavelength of light, $\lambda$; and
    determining the optimal $f_{stop}$ from the relationship
    $f_{stop}=f*\sqrt{(d/(2.44*\lambda*o*(o-d)))}$.

3. The method of claim 2, wherein determining the optimal $f_{stop}$ from the relationship further comprises:
    inputting the focal length, the distance, the depth-of-field and the wavelength into a processor;
    operating the processor to compute the relationship; and
    outputting the optimal $f_{stop}$.

4. The method of claim 3, wherein determining the distance and selecting the depth-of-field further comprises utilizing a range finder.

5. The method of claim 1, wherein:
    computing the optimal $f_{stop}$ utilizes the relationship:
    $f_{stop}=f*\sqrt{(d)/o}$; and
    said discrete $f_{stop}$ does not exceed said optimal $f_{stop}$.

6. The method of claim 5, wherein determining the optimal $f_{stop}$ from the relationship further comprises:
    inputting the focal length, the distance and the depth-of-field into a processor;
    operating the processor to compute the relationship; and
    outputting the optimal $f_{stop}$.

7. The method of claim 6, wherein determining the distance and selecting the depth-of-field further comprises utilizing a range finder.

8. An apparatus for setting a camera $f_{stop}$, comprising:
    a focal length f selector;
    a range finder to measure a distance o between said camera and an object to be focused and to measure a depth-of-field d in front of said object;
    a light wavelength selector $\lambda$;
    a module to compute an optimal $f_{stop}$ as a function of said depth-of-field, said distance and said focal length, wherein the module computes the optimal $f_{stop}$ from the relationship:
    $f_{stop}=f*\sqrt{(d/(2.44*\lambda*o*(o-d)))}$; and
    a camera $f_{stop}$ adjuster to set said camera $f_{stop}$ to a discrete $f_{stop}$ closest to said optimal $f_{stop}$.

9. The apparatus of claim 8, wherein the apparatus is incorporated within a camera.

10. The apparatus of claim 8, wherein:
    the module computes the optimal $f_{stop}$ from the relationship:
    $f_{stop}=f*\sqrt{(d)/o}$; and
    the adjuster sets the discrete $f_{stop}$ such that said discrete $f_{stop}$ does not exceed said computed optimal $f_{stop}$.

11. The apparatus of claim 10, wherein the apparatus is incorporated within a camera.

12. A method for setting a camera $f_{stop}$, comprising:
    selecting a focal length, f;
    determining a distance, o, between said camera and an object to be focused;
    a depth-of-field, d, in front of said object;
    computing an optimal $f_{stop}$ as a function of said depth-of-field, said distance and said focal length by specifying a wavelength of light, $\lambda$, and determining the optimal $f_{stop}$ from the relationship
    $f_{stop}=f*\sqrt{(d/(2.44*\lambda*o*(o-d)))}$; and
    adjusting said camera $f_{stop}$ to a discrete $f_{stop}$ closest to said computed optimal $f_{stop}$.

13. The method of claim 14, wherein determining the optimal $f_{stop}$ from the relationship further comprises:
    inputting the focal length, the distance, the depth-of-field and the wavelength into a processor;
    operating the processor to compute the relationship; and
    outputting the optimal $f_{stop}$.

14. The method of claim 13, wherein determining the distance and selecting the depth-of-field further comprises utilizing a range finder.

15. The method of claim 14, wherein:
    computing the optimal $f_{stop}$ utilizes the relationship:
    $f_{stop}=f*\sqrt{(d)/o}$; and
    said discrete $f_{stop}$ does not exceed said optimal $f_{stop}$.

16. The method of claim 15, wherein determining the optimal $f_{stop}$ from the relationship further comprises:
    inputting the focal length, the distance and the depth-of-field into a processor;
    operating the processor to compute the relationship; and
    outputting the optimal $f_{stop}$.

17. The method of claim 16, wherein determining the distance and selecting the depth-of-field further comprises utilizing a range finder.

* * * * *